Oct. 14, 1941.   G. R. HAUB   2,259,377
FITTER MECHANISM FOR GLASSWARE
Filed Sept. 11, 1939
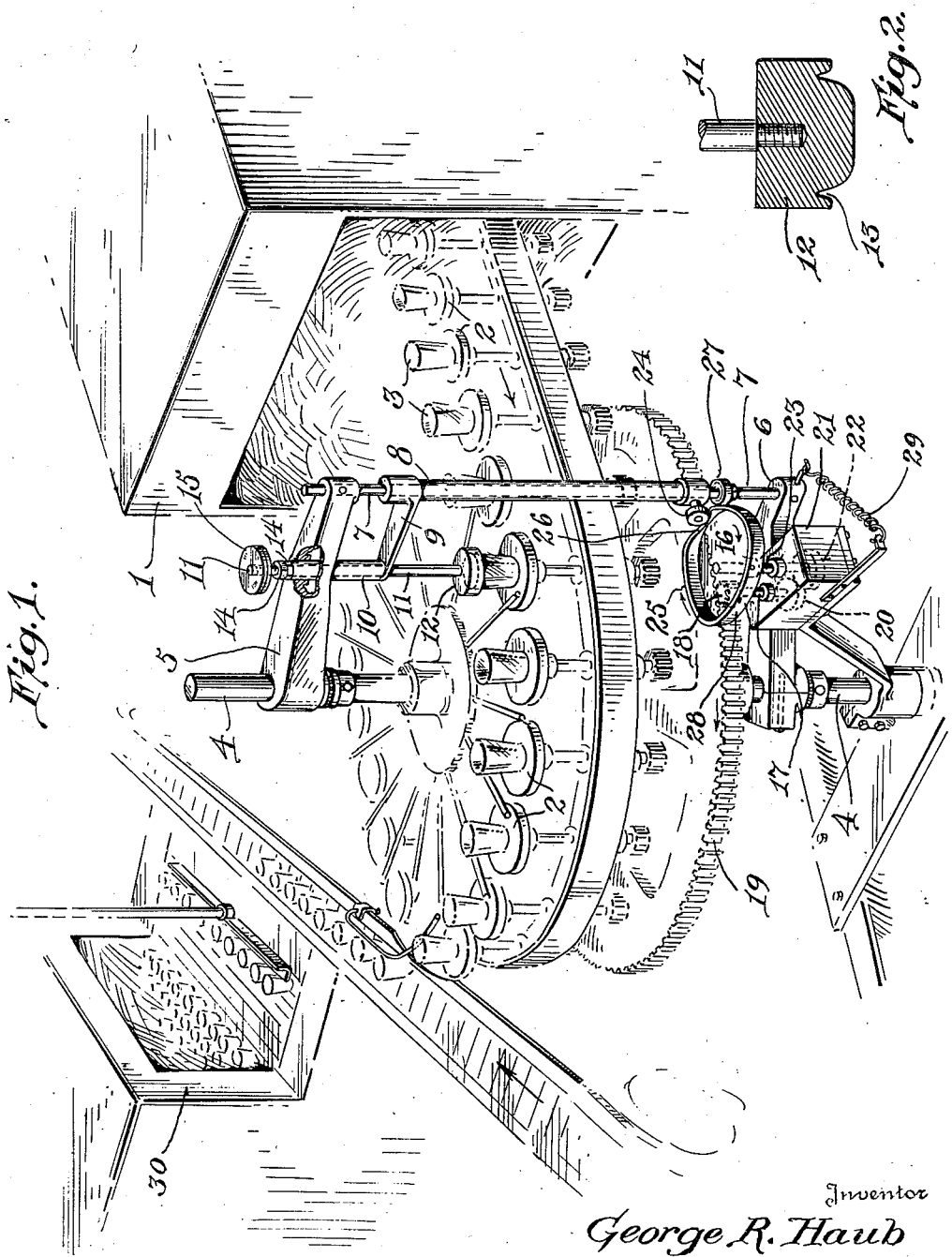
Inventor
George R. Haub
By Eccleston + Eccleston
Attorneys Patented Oct. 14, 1941

2,259,377

UNITED STATES PATENT OFFICE 2,259,377

FITTER MECHANISM FOR GLASSWARE

George R. Haub, Zanesville, Ohio, assignor to Hazel-Atlas Glass Company, Wheeling, W. Va., a corporation of West Virginia Application September 11, 1939, Serial No. 294,403

4 Claims. (Cl. 49—22)

In the manufacture of glass articles, such as tumblers, and particularly tumblers which are intended to be sealed with caps, it is highly desirable that the mouths of the completed articles be truly circular in form, and of a uniform diameter. As the tumblers come from the press or other forming machine there is often a slight variation in the diameter of the mouths, and they are not always truly circular. Consequently an adequate seal is not obtained, in many cases, when the caps are applied to the tumblers or other glass articles.

The object of the present invention is to provide a simple and inexpensive fitting mechanism by which a fitter head or cup will be applied to the mouth of each article so that the mouths of the articles will be truly circular, and will be of the exact diameter required.

Various other objects and advantages of the invention will be apparent to those skilled in the art, from the following detailed description, when taken in connection with the accompanying drawing, in which Figure 1 is a perspective view of the fitter mechanism, associated with a fire-polisher, and Figure 2 is a vertical sectional view of the fitter head.

Referring to the drawing in more detail, numeral 1 indicates the housing of a fire-polisher. In accordance with the common practice the cups 2 travel continuously through the fire-polisher, with a tumbler 3, or other glass article, centered on each cup. As the cups travel forward they are also rotated, while the articles are being subjected to a flame, whereby the articles are highly polished.

The rotation of the cups 2 is discontinued as the cups emerge from the fire-polisher, and while the articles still retain the heat from the fire-polishing operation, and while they are still being carried forward by the cups, a fitter head is successively applied to the mouth of each tumbler or other article.

Numeral 4 refers to the stationary shaft around which the cups travel. Oscillatably mounted on the shaft, adjacent the upper end thereof, is an arm 5; and a similar arm 6 is oscillatably mounted on the shaft adjacent the lower end thereof. The free ends of the arms 5 and 6 are connected by a vertically extending rod 7, which is pinned to the arms.

Loosely mounted on the rod 7 is a sleeve 8. Extending inwardly from the upper end of the sleeve is a bracket 9, and this bracket carries at its inner end a vertically extending bushing 10 which is slidably mounted in the arm 5. Slidably mounted in this bushing 10 is a rod 11 which carries at its lower end a fitter head or cup 12. The fitter head of the present embodiment which is shown in section in Figure 2, is provided with a circular groove 13, and when this groove is applied to a tumbler the mouth of the latter is caused to conform to the groove, whereby the mouths of the completed articles are truly circular and of uniform diameter. Of course the fitter head may be of any desired form and size.

The upper end of the rod 11 which extends above the bushing 10, is threaded, and nuts 14 are screwed thereon. These nuts adjustably limit the downward movement of the fitter head 12 with respect to the bushing 10, and also cause the fitter head to be raised when the bushing is raised. If desired, weights 15 may be attached to the upper end of the rod 11, and of course the weights may be varied to suit different glassware.

Numeral 16 refers generally to a double cam for operating the fitter head. This cam is continuously rotated, in the direction of the arrows, by any desired means. In the particular embodiment illustrated, a shaft 17 carries at its upper end a pinion 18 which meshes with gear 19 for driving the continuously moving conveyer of the fire-polisher. The shaft 17 carries at its lower end a pinion 20, in the stationary gear box 21. The pinion 20 meshes with a pinion 22 on the lower end of a shaft 23, and this shaft carries at its upper end the double cam 16. This cam causes the fitter head to be raised and lowered, and to travel back and forth, as will now be described.

The sleeve 8 carries a roller 24 which rides on top of the cam track 25. When the rotation of the cam brings the depressed portion 26 of the cam track beneath the roller 24, the sleeve 8 slides down on the rod 7 by gravity. And of course at the same time the bracket 9 and bushing 10 move downward, to thereby permit the downward movement, by gravity, of rod 11 and fitter head 12, until the fitter head engages the mouth of the tumbler 3, or other article. The engagement of the circular groove 13 of the fitter head, with the mouth of the tumbler, causes the mouth to conform to the groove. The continued rotation of the cam causes the sleeve 8 to be lifted, thereby lifting the fitter head from the tumbler.

The cups 2 carrying the tumblers 3 travel about the shaft 4 as a center, and as the fitter head is carried by the arm 5 which is mounted on the shaft 4, it follows that the fitter head will travel in the same path as the tumblers centered on the cups 2; but while the cups are always travelling in the one direction indicated by the arrow, the fitter head is oscillated back and forth so that it can successively engage each tumbler and travel with it during the fitting operation.

For oscillating the fitter head the rod 7 is provided with a roller 27 which rides about the cam surface 28. The roller is held against the cam surface by a spring 29. Thus as the cam rotates it will cause the rod 7, the arms 5 and 6, and the fitter head 12 associated with the arm 5, to be oscillated back and forth about the shaft 4 as a center.

The arrangement is such that the cam track 25 will permit the fitter head to move downwardly to engage a tumbler, and the cam surface 28 will then permit the fitter head to travel forward with the tumbler. This engagement of the fitter head with the tumbler causes the mouth thereof to assume a truly circular form of the exact diameter desired.

After the fitter head has engaged the tumbler mouth the cam track 25 causes the fitter head to be lifted from the tumbler, the cam surface 28 moves the head back about the shaft 4 as a center, and the cam track 25 permits the head to move downward into engagement with the next tumbler or other article to be fitted.

After the articles have been fitted they may be delivered to a leer 30 for the annealing operation.

From the foregoing description it will be apparent that I have devised a very simple and inexpensive mechanism by which tumblers or other glass articles can be quickly fitted, so that the mouths of the articles will be perfectly circular and of uniform diameter, whereby an efficient seal will be provided when caps are applied to the tumblers.

Having fully described the invention, what I claim is:

1. An apparatus of the character described, including a vertical shaft, conveyer cups travelling in a circular path about said shaft as a center, said cups adapted to carry glass articles to be fitted, a laterally extending arm mounted on said shaft, a rod extending downwardly from said arm, cam means for oscillating said rod and arm about said shaft, a sleeve slidably mounted on said rod, a vertically extending bushing carried by said sleeve, a rod mounted in the vertical bushing, a fitter head carried by said last-mentioned rod, and cam means for raising and lowering said sleeve.

2. A fitter mechanism for glass articles, including a vertical shaft, conveyer cups traveling in a circular path about said shaft as a center, said cups adapted to carry glass tumblers or the like to be fitted, a laterally extending arm mounted on said shaft, a vertical rod freely slidable in said arm, a non-rotatable fitter head having a downwardly facing annular groove mounted on the lower end of said rod, means for raising the rod and fitter head and permitting the rod and fitter head to descend by gravity to bring the fitter head into fitting engagement with a tumbler mouth, and means for oscillating said arm to cause the fitter head to travel with the tumbler.

3. A fitter mechanism for glass articles, including a vertical shaft, conveyer cups traveling in a circular path about said shaft as a center, said cups adapted to carry glass tumblers or the like to be fitted, a laterally extending arm mounted on said shaft, a vertical sleeve mounted in said arm and movable up and down, a rod freely slidable in said sleeve, a non-rotatable fitter head having a downwardly facing annular groove mounted on the lower end of said rod, means on the upper end of the rod for limiting the downward movement of the rod with respect to the sleeve, means for raising the sleeve, rod and fitter head and permitting them to descend by gravity to bring the fitter head into fitting engagement with a tumbler mouth, and means for oscillating said arm to cause the fitter head to travel with the tumbler.

4. A fitter mechanism for glass articles, including a continuously traveling conveyer adapted to carry glass tumblers or the like to be fitted, a vertical sleeve movable up and down, a rod freely slidable in said sleeve, a non-rotatable fitter head having a downwardly facing annular groove on the lower end of said rod, means on the upper end of the rod for limiting the downward movement of the rod with respect to the sleeve, means for raising the sleeve, rod and fitter head and permitting them to descend by gravity to bring the fitter head into fitting engagement with a tumbler mouth, and means for moving the sleeve, rod and fitter head back and forth to cause the fitter head to travel with the tumbler.

GEORGE R. HAUB